United States Patent [19]

Anton et al.

[11] Patent Number: 5,627,238

[45] Date of Patent: May 6, 1997

[54] COATING COMPOSITIONS OF AN ACRYLIC POLYMER AND A FLUORINATED POLYISOCYANATE

[75] Inventors: Douglas R. Anton, Wilmington, Del.; Michael J. Darmon, Aston; William F. Graham, Wayne, both of Pa.; Richard R. Thomas, Wilmington, Del.

[73] Assignee: E. I. Du Pont de Nemours and Company, Wilmington, Del.

[21] Appl. No.: 543,677

[22] Filed: Oct. 16, 1995

[51] Int. Cl.$^6$ ............................ C08G 18/70; C08F 20/10
[52] U.S. Cl. .................... 525/330.3; 525/330.4; 525/330.5; 524/590; 528/70
[58] Field of Search ............. 525/330.5, 330.3, 525/333.6; 524/590; 528/70

[56] References Cited

U.S. PATENT DOCUMENTS

| | | | |
|---|---|---|---|
| 2,803,615 | 8/1957 | Ahlbrecht et al. | 260/29.6 |
| 3,255,131 | 6/1966 | Ahlbrecht et al. | 260/22 |
| 3,318,852 | 5/1967 | Dixon | 260/78.5 |
| 3,533,977 | 10/1970 | Read | 260/28.5 |
| 3,547,894 | 12/1970 | Smeltz | 260/77.5 |
| 3,558,564 | 1/1971 | Vasta | 260/77.5 |
| 3,759,874 | 9/1973 | Gresham | 260/77.5 |
| 3,972,856 | 8/1976 | Mitsch et al. | 260/77.5 |
| 4,366,299 | 12/1982 | Dessaint | 526/243 |
| 4,371,657 | 2/1983 | Chang | 524/512 |
| 4,396,680 | 8/1983 | Chang | 428/421 |
| 4,782,130 | 11/1988 | Re et al. | 528/70 |
| 4,791,166 | 12/1988 | Saukaitis | 524/544 |
| 4,812,337 | 3/1989 | Sugimura et al. | 427/407.1 |
| 4,841,007 | 6/1989 | Zdrahala et al. | 528/28 |
| 4,859,754 | 8/1989 | Maekawa et al. | 526/245 |
| 5,064,695 | 11/1991 | Hotta et al. | 427/407.1 |
| 5,159,017 | 10/1992 | Miyazono et al. | 525/123 |
| 5,171,877 | 12/1992 | Knaup et al. | 560/26 |
| 5,206,286 | 4/1993 | Swarup | 524/761 |
| 5,250,698 | 10/1993 | Falk et al. | 548/260 |
| 5,356,668 | 10/1994 | Paton et al. | 427/2.25 |

FOREIGN PATENT DOCUMENTS

| | | |
|---|---|---|
| 60-184513 | 9/1985 | Japan. |
| 61-14267 | 1/1986 | Japan. |
| 61-23656 | 2/1986 | Japan. |
| 61-23657 | 2/1986 | Japan. |
| 61-95078 | 5/1986 | Japan. |
| 62-26736 | 11/1987 | Japan. |
| 63-287615 | 12/1991 | Japan. |

*Primary Examiner*—Tae Yoon
*Attorney, Agent, or Firm*—Hilmer L. Fricke

[57] ABSTRACT

A coating composition containing about 45–80% by weight of a binder and 20–55% by weight of an organic liquid; wherein the binder contains (A) about 40–90% by weight, based on the weight of the binder, of an acrylic polymer containing polymerized hydroxyl containing monomers of the following group of hydroxy alkyl acrylate or methacrylates having 1–4 carbon atoms in the alkyl group, and polymerized alkyl acrylates and methacrylates having 1–18 carbon atoms in the alkyl groups, or styrene or any mixtures of the above and (B) about 10–60% by weight, based on the weight of the binder, of a fluorinated organic polyisocyanate crosslinking agent.

7 Claims, No Drawings

COATING COMPOSITIONS OF AN ACRYLIC POLYMER AND A FLUORINATED POLYISOCYANATE

BACKGROUND OF THE INVENTION

1. Field of the Invention

This invention is directed to coating compositions of acrylic polymers and fluorinated isocyanates that remain relatively dirt free under exterior use conditions and are easily cleaned for example by washing with water when soiled.

2. Description of the Prior Art

Acrylic polymer containing coating compositions crosslinked with a polyisocyanate are well known as shown in Vasta U.S. Pat. No. 3,558,564 issued Jan. 26, 1971 and Krueger U.S. Pat. No. 4,156,678 issued May 29, 1979. Coating compositions of blends of acrylic polymers and acrylic polymer containing fluorocarbon constituents that form antiicing coatings are well known. Clear coats containing acrylic polymers having small amounts of fluorocarbon constituents that are applied over metallic base coats to provide auto finishes that have good weatherability, have high water and oil repellence and stain resistance are shown in Sugimura et al U.S. Pat. No. 4,812,337 issued Mar. 14, 1989.

Fluorinated polyurethanes that are used as soil release agents are shown in Gresham U.S. Pat. No. 3,759,874 issued Sep. 18, 1973. Polyurethanes of fluorinated isocyanates that are used as adhesives are shown in Mitsch et al U.S. Pat. No. 3,972,856 issued Aug. 3, 1976. Protective coatings of fluorinated polyurethanes of fluorinated diols or triols are shown in Re et al U.S. Pat. No. 4,782,130 issued Nov. 1, 1988.

There is a need for a coating composition that provides for soil resistance, is easily cleaned, has a low content of fluorocarbon constituents which reduces the cost of the composition since the fluorocarbon constituent of the composition is expensive, and gives a coating that is high in solids that can be applied with conventional equipment and cures to a hard, tough, durable and weatherable finish without baking at elevated temperatures.

SUMMARY OF THE INVENTION

A coating composition containing about 45–80% by weight of a binder and 20–55% by weight of an organic liquid; wherein the binder contains (A) about 40–90% by weight, based on the weight of the binder, of an acrylic polymer containing about 20–50% by weight, based on the weight of the acrylic polymer, of polymerized hydroxyl containing monomers selected from the following group of hydroxy alkyl acrylate or methacrylates having 1–4 carbon atoms in the alkyl group, about 50–80% by weight, based on the weight of the acrylic polymer, of polymerized alkyl acrylates and methacrylates having 1–18 carbon atoms in the alkyl groups, or styrene or any mixtures of the above and the acrylic polymer has a weight average molecular weight of about 2,000–20,000 determined by gel permeation chromatography and (B) about 10–60% by weight, based on the weight of the binder, of a fluorinated organic polyisocyanate crosslinking agent.

Articles coated with the composition also are part of this invention.

DETAILED DESCRIPTION OF THE INVENTION

The coating composition of this invention primarily is used as a clear coat over a pigmented base coat containing solid color pigments or metallic flake pigments or mixtures thereof. The coating composition also can be used as a conventional pigmented composition. The coating composition can be applied with conventional spray equipment and cured at ambient temperatures or slightly elevated temperatures which decrease drying time. The resulting finish has excellent gloss and distinctness of image.

Preferably, the coating composition is a clear coating composition, i.e. containing no pigments or a small amount of transparent pigment. The composition has a relatively high solids content of about 45–80% by weight of binder and about 20–55% by weight of an organic carrier which can be a solvent for the binder or a mixture of solvents and non solvent which would form a non aqueous dispersion. The composition has a low VOC (volatile organic content) and meets current pollution regulations.

The acrylic polymer used in the coating composition is prepared by conventional polymerization techniques in which the monomers, solvent, and polymerization initiator are charged over a 1–24 hour period of time, preferably in a 2–8 hour time period, into a conventional polymerization reactor in which the constituents are heated to about 60°–175° C., preferably about 140°–170° C. The acrylic polymer formed has a weight average molecular weight of about 2,000–20,000, preferably about 5,000–10,000.

Molecular weight is determined by gel permeation chromatography using polystyrene as the standard.

Typical polymerization initiators that are used in the process are azo type initiators such as azo-bis-isobutyronitrile, 1,1'-azo-bis(cyanocyclohexane), peroxy acetates such as t-butyl peracetate, peroxides such as di-t-butyl peroxide, benzoates such as t-butyl perbenzoate, octoates such as t-butyl peroctoate and the like.

Typical solvents that can be used in the process are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, esters, acetates and mixture of any of the above.

Typical polymerizable monomers that are used to form the acrylic polymer are alkyl (meth)acrylates, meaning alkyl acrylates and alkyl methacrylates, having 1–18 carbon atoms in the alkyl group such as methyl methacrylate, ethyl acrylate, ethyl methacrylate, propyl acrylate, propyl methacrylate, isopropyl methacrylate, butyl acrylate, isobutyl methacrylate, butyl methacrylate, t-butyl methacrylate, pentyl acrylate, pentyl methacrylate, hexyl acrylate, hexyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate; other useful monomers are styrene, alpha methyl styrene, acrylamide, methacrylamide, acrylonitrile, hydroxy methacrylamide and the like; or any mixtures of these monomers, and hydroxy alkyl (meth)acrylates meaning hydroxy alkyl acrylates and hydroxy alkyl methacrylates having 1–4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like.

Preferred acrylic polymers which form high quality coatings contain polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group and styrene. One particularly preferred polymer contains butyl methacrylate, butyl acrylate, styrene, and hydroxy propyl acrylate.

The coating composition contains about 10–60% by weight of a fluorinated organic polyisocyanate crosslinking agent which is an adduct of a fluorinated monofunctional alcohol and a conventional organic polyisocyanate. About 0.1–33 mole percent of active isocyanate groups are reacted with the fluorinated monofunctional alcohol to form the fluorinated organic polyisocyanate. Tyically, the constituents are reacted with a catalyst for about 0.1–4 hours at a temperature of about 50°–120° C. to form the adduct.

Any of the conventional aromatic, aliphatic, cycloaliphatic di and trifunctional polyisocyanates can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,5-toluene triisocyanate and the like. Oligomers of diisocyanates also can be used such as the trimer of hexamethylene diisocyanate which is sold under the tradename "Desmodur" N. One particularly preferred oligomer is "Desmodur" N-3390.

Typical fluorinated monofunctional alcohols used to form the isocyanate functional adducts are represented by the formula

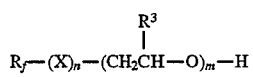

where $R_f$ is a fluoroalkyl containing group having at least 4 carbon atoms and preferably a straight chain or branched chain fluoroalkyl group having 4–20 carbon atoms which optionally can contain oxygen atoms as ether groups or can contain 1–5 chlorine atoms or 1–5 hydrogen atoms. Preferably, $R_f$ is a perfluoroalkyl group having 4–20 carbon atoms and most preferably, $R_f$ is a perfluoroalkyl group containing 6–12 carbon atoms. X is a divalent radical, preferably —$CH_2CH_2O$—, —$SO_2N(R^4)CH_2CH_2O$—, —$CH_2$—, —O—, $CH_2O$— where $R^4$ is an alkyl group preferably having 1–4 carbon atoms. $R^3$ is H or an alkyl group having 1–4 carbon atoms, H and methyl being preferred, n is 0–1 and m is 0–30, provided that if n is 0, then m must be greater than or equal to 1, if m is 0, then n is 1; if X is —O—, m must be greater than or equal to 1; m preferably is 1–20.

The following are preferred fluorinated monofunctional alcohols:

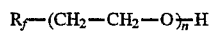

where $R_f$ is a perfluoroalkyl group having 6–12 carbon atoms and n is 5–15;

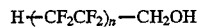

where n is 1–6;

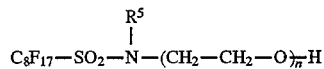

where $R^5$ is an alkyl group having 1–4 carbon atoms and n is 1–30;

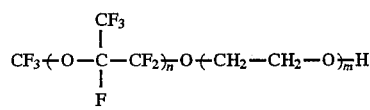

where n is 0–10 and m is 1–20; and $R_f$—$CH_2$—$CH_2$—OH where $R_f$ is described above.

To improve weatherability of a clear coating composition about 0.1–10% by weight, based on the weight of the binder, of ultraviolet light stabilizers, screeners, quenchers and antioxidants usually are added. Typical ultraviolet light screeners and stabilizers include the following:

Benzophenones such as hydroxy dodecyl oxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxy phenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxybenzoyl)-triazole, substituted benzotriazoles such as hydroxyphenyltriazole and the like.

Hindered a mines such as bis(1,2,2,6,6 pentamethyl-4-piperidinyl sebacate), di[4(2,2,6,6,tetramethyl piperidinyl)] sebacate and the like and any mixtures of any of the above.

The coating composition contains a sufficient amount of a catalyst to cure the composition at ambient temperatures. Generally, about 0.01–2% by weight, based on the weight of the binder, of catalyst is used. Typically useful catalysts are triethylene diamine and alkyl tin laurates such as dibutyl tin dilaurate, dibutyl tin diacetate, tertiary amines and the like. Preferred is dibutyl tin dilaurate.

Generally, flow control agents are used in the composition in amounts of about 0.1–5% by weight, based on the weight of the binder, such as polyacrylic acid, polyalkylacrylates, polyether modified dimethyl polysiloxane copolymers and polyester modified polydimethyl siloxane.

When the coating composition is used as a clear coating composition usually over a pigmented base coat, it may be desirable to use pigments in the coating composition which have the same refractive index as the dried coating. Typically useful pigments have a particle size of about 0.015–50 micron and are used in a pigment to binder weight ratio of about 1:100 to 10:100 and are inorganic siliceous pigments such as silica pigment having a refractive index of about 1.4–1.6.

It is highly desirable to use at least some fluorinated organic polyisocyanate crosslinking agent, as described above, in the pigmented base coat over which the clear coat of this invention is applied to significantly reduce cratering of the base coat. Usually, about 10–40% by weight, based on the weight of the binder, of the fluorinated polyisocyanate is used in the base coat.

When the coating composition is used as a clear coating on a vehicle such as a car, truck, bus, train, or on construction equipment, industrial equipment, structures such as tanks, bridges, exterior or interior of buildings, a basecoating which may be either a solvent based or waterbased composition is first applied and then the clear coating is applied usually by conventional means such as spraying or electrostatic spraying. The clear coating is dried and cures at ambient temperatures but moderately high temperatures of up to about 90° C. can be used to shorten drying time.

The coating composition can be used as a conventional pigmented coating composition containing pigments in a pigment to binder weight ratio of about 0.1–100. The composition can be used to coat any of the aforementioned items and substrates and provides a finish that has good gloss and is weatherable, tough and hard.

The following examples illustrate the invention. All parts and percentages are on a weight basis unless otherwise specified. Molecular weight was determined by gel permeation chromatography using polystyrene as the standard.

EXAMPLE 1

An acrylic polymer I solution was prepared by charging the following constituents into a reactor equipped with a heat source, a thermometer and a stirrer:

|  | Parts By Weight |
|---|---|
| Portion 1 | |
| Methyl amyl ketone | 699.20 |
| Portion 2 | |
| Butyl methacrylate monomer (BMA) | 583.80 |
| Styrene monomer (S) | 307.28 |
| Butyl acrylate monomer (BA) | 343.20 |
| Hydroxy propyl acrylate monomer (HPA) | 783.60 |
| Methyl amyl ketone | 4.72 |
| Portion 3 | |
| T-butyl peroxy acetate | 69.01 |
| Methyl amyl ketone | 114.59 |
| Portion 4 | |
| Methyl amyl ketone | 33.28 |
| Total | 2938.68 |

Portion 1 was charged into the reaction vessel and blanketed with nitrogen and Portion 2 was premixed and added over a 360 minute period while holding the resulting mixture at its reflux temperature of about 150° C. Portion 3 was premixed and then added at one time to the reaction mixture 350 minutes after the start of the addition of Portion 2. Portion 4 was premixed and added at the same time as Portion 2 to the reaction mixture over a 375 minute period and then Portion 5 was added and the reaction mixture was held at its reflux temperature for an additional 60 minutes. The resulting polymer solution was cooled to room temperature.

The resulting acrylic polymer solution I had a weight solids content of about 70%, a polymer of BMA/S/BA/HPA in the following percentages 30%/15.0%/17%/38% and the polymer had a weight average molecular weight of about 7,000.

Fluorinated polyisocyanate solution I was prepared by mixing the following constituents in a reaction vessel equipped with a mechanical stirrer, condenser, nitrogen inlet and a thermocouple:

|  | Parts by Weight |
|---|---|
| Portion 1 | |
| Aliphatic isocyanate resin - trimer of hexamethylene diisocyanate (98.9% solids) | 3000.00 |
| Butyl acetate | 275.00 |
| Ethyl acetate | 550.00 |
| Ethylene glycol monobutyl ether acetate | 175.00 |
| Portion 2 | |
| Fluoroalkyl alcohol F(CF$_2$)nCH$_2$CH$_2$O(CH$_2$CH$_2$O)$_m$H where n is an average of 6 and m is an average of 7.5 | 27.20 |
| Di-n-butyl tin dilaurate solution (2% solids in ethyl acetate) | 0.50 |
| Total | 4027.70 |

Portions 1 and 2 were each added to the reaction vessel trader a positive pressure of nitrogen and heated to about 75°–80° C. and held at this temperature for about 2 hours and allowed to cool overnight. The resulting fluorinated polyisocyanate solution I contained about 1% of the fluorinated component.

Fluorinated polyisocyanate solution II was prepared as above except the amount of the fluorinating component was reduced by 50% which resulted in a fluorinated polyisocyanate that contained 0.5% of the fluorinated component.

A clear acrylic composition I was prepared as follows:

|  | Parts by Weight |
|---|---|
| Portion 1 | |
| Methyl ethyl ketone | 2.54 |
| Toluene | 2.67 |
| Dibasic acid ester (ester mixture of adipic acid, glutaric acid and succinic acid) | 1.79 |
| Butyl Cellosolve Acetate | 4.96 |
| Portion 2 | |
| Acrylic polymer I solution (prepared above) | 72.79 |
| Portion 3 | |
| Resiflow S (Acrylic polymer flow additive) | 0.35 |
| "Tinuvin" 328 - 2-(2-hydroy-3,5-ditertiary amyl phenol)-2H-benzotriazole) | 5.58 |
| "Tinuvin" 292 - (1,2,2,6,6-pentamethyl-4-piperidinyl) sebacate | 0.87 |
| Dibutyl tin dilaurate | 0.92 |
| PM acetate | 7.38 |
| Total | 100.00 |

The constituents of Portion 1 were charged into a mixing vessel in the order shown with continuous mixing. Portion 2 was added and mixed for 15 minutes. The constituents of Portion 3 were charged into the mixing vessel in the order shown with constant mixing. The resulting composition had a solids content of about 53.5%.

A clear coating composition I was prepared by mixing the above clear acrylic composition I with a the above prepared fluorinated polyisocyanate solution I in a 3/1 volume ratio. Clear coating composition II was prepared by mixing the above clear acrylic composition I with the above prepared fluorinated polyisocyanate solution II in a 3/1 volume ratio.

Two phosphated cold rolled steel panels that had been coated with a cured electrocoating composition of a polyepoxy hydroxy ether resin crosslinked with a polyisocyanate were spray coated with a white basecoat coating composition of an acrylic polymer containing an organic polyisocyanate crosslinking agent to a dry film thickness of about 18–23 microns. The basecoat was allowed to stand for about 10 minutes to allow solvent to evaporate and then the above prepared clear coating composition I was spray applied. Two coats were applied with a solvent evaporation time of 2 minutes between the application of each coat. The resulting film was dried at about 83° C. for about 30 minutes. The dry film thickness of the clear coat was about 44–56 microns. The resulting clear coat was smooth and essentially free of craters and had an excellent appearance.

A second set of two panels was prepared. Phosphated cold rolled steel panel electrocoated with the same above described electrocoating composition were coated with a black basecoat coating composition identical to the white basecoat coating composition except black pigmentation was used instead of white pigment and coated with the clear coating composition I as above and dried and cured as above. The resulting clear coat was smooth and essentially free of craters and had an excellent appearance. The following properties of the clear coated panel were measured and the results are shown in Table I: 20° Gloss and Distinctness of Image(DOI).

TABLE 1

| Clear Coat | Base Coat | 20° gloss | DOI | Calculated PPM Fluorine in Composition |
|---|---|---|---|---|
| I | black | 80.1 | 95.6 | 1700 |
| I | black | 81.7 | 95.7 | 1700 |
| I | white | 78.2 | 94.5 | 1700 |
| I | white | 76.9 | 90.0 | 1700 |
| II | black | 76.5 | 97.1 | 900 |
| II | black | 78.7 | 86.6 | 900 |
| II | white | 80 | 96.3 | 900 |
| II | white | 79.6 | 96.6 | 900 |

The finishes provided by the clear coating compositions have good gloss and distinctness of image.

EXAMPLE 2

Fluorinated polyisocyanate solution III was prepared by mixing the following constituents in a reaction vessel equipped with a mechanical stirrer, condenser, nitrogen inlet and a thermocouple:

| | Parts by Weight |
|---|---|
| Portion 1 | |
| Aliphatic isocyanate resin (described in Example 1) | 3,626.0 |
| Butyl acetate | 332.0 |
| Ethyl acetate | 665.0 |
| Ethylene glycol monobutyl ether acetate | 212.0 |
| Portion 2 | |
| Fluoroalkyl alcohol [F(CF$_2$CF$_2$)$_n$CH$_2$CH$_2$OH which is a blend of homologuous series where 1–2% n = 2, 27–34% n = 3, 29–34% n = 4, 17–21% n = 5, 6–9% n = 6, 2–5% n = 7 and 1–2% n = 8] | 116.0 |
| Di-n-butyl tin dilaurate (2% solids in ethyl acetate) | 0.5 |
| Total | 4951.5 |

Portions 1 and 2 were each added to the reaction vessel under a positive pressure of nitrogen and heated to about 75°–85° C. and held at this temperature for about 2 hours and allowed to cool overnight. The resulting fluorinated polyisocyanate solution III contained about 2.5% of the fluorinated component.

A clear coating composition III was prepared by mixing the clear acrylic composition I, described in Example 1, with the above fluorinated polyisocyanate solution III in a 3/1 volume ratio. Two phosphated cold rolled steel panels electrocoated as described in Example 1 were spray coated with a white base coat desdribed in Example 1 and coated with the clear coating composition III and cured following the procedure of Example 1. The resulting clear coat was smooth and essentially free of craters and had an excellent appearance.

EXAMPLE 3

Fluorinated polyisocyanate solution IV was prepared by mixing the following constituents in a reaction vessel equipped with a mechanical stirrer, condenser, nitrogen inlet and a thermocouple:

| | Parts by Weight |
|---|---|
| Portion 1 | |
| Aliphatic isocyanate resin (described in Example 1) | 3,064.0 |
| Butyl acetate | 281.0 |
| Ethyl acetate | 562.0 |
| Ethylene glycol monobutyl ether acetate | 179.0 |
| Portion 2 | |
| Fluoroalkyl alcohol [Rf-CH$_2$CH$_2$—O—(CH$_2$CH$_2$O)$_n$—H where Rf is approximately 1% CF9, 50–60% C6F13, 20–40% C8F17, 5–15% C10F21, 1–5% C12F25, n is 15–20] | 27.8 |
| Di-n-butyl tin dilaurate (2% solids in ethyl acetate) | 0.5 |
| Total | 4114.3 |

Portions 1 and 2 were each added to the reaction vessel under a positive pressure of nitrogen and heated to about 75°–85° C. and held at this temperature for about 2 hours and allowed to cool overnight.

A clear coating composition IV was prepared by mixing the clear acrylic composition I, described in Example 1, with the above fluorinated polyisocyanate solution IV in a 3/1 volume ratio. Two phosphated cold rolled steel panels electrocoated as described in Example 1 were spray coated with a white base coat described in Example 1 and coated with the clear coating composition IV and cured following the procedure of Example 1. The resulting clear coat was smooth and essentially free of craters and had an excellent appearance.

We claim:

1. A coating composition containing about 45–80% by weight of a binder and 20–55% by weight of an organic liquid; wherein the binder comprises
   (A) about 40–90% by weight, based on the weight of the binder, of an acrylic polymer consisting essentially of about 20–50% by weight, based on the weight of the acrylic polymer, of polymerized hydroxyl containing monomers selected from the group consisting of hydroxy alkyl acrylate and hydroxy alkyl methacrylates having 1–4 carbon atoms in the alkyl groups, 50–80% by weight, based on the weight of the acrylic polymer, of polymerized monomers selected from the group consisting of alkyl acrylates and alkyl methacrylates having 1–18 carbon atoms in the alkyl groups, styrene or any mixtures of the above and acrylic polymer having a weight average molecular weight of about 2,000–20,000 determined by gel permeation chromatography, (B) about 10–60% by weight, based on the weight of the binder, of a fluorinated organic polyisocyanate crosslinking agent consisting essentially of an adduct of a fluorinated monofunctional alcohol and an organic polyisocyanate where the fluorinated monofunctional alcohol is represented by the formula

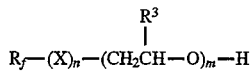

where $R_f$ is a fluoroalkyl containing group having at least 4 carbon atoms, X is a divalent radical, $R^3$ is H or an alkyl group having 1–4 carbon atoms, n is 1 and m is 1–30, and where about 0.1–33 mole percent of active isocyanate groups are reacted with the fluorinated monofunctional alcohol.

2. The coating composition of claim 1 in which $R_f$ is a straight chain or branched perfluoroalkyl group having 4–20 carbon atoms.

3. The coating composition of claim 2 in which X is $-O-$, $CH_2CH_2O-$, $-CH_2O-$, $-SO_2N(R^4)CH_2CH_2O-$, $-CH_2-$ where $R^4$ is an alkyl group having 1–4 carbon atoms, $R^3$ is H or methyl.

4. The coating composition of claim 2 in which the organic polyisocyanate is an aromatic diisocyanate, aliphatic diisocyanate, cycloaliphatic diisocyanate, aromatic triisocyanate, aliphatic triisocyanate or an oligomer of a diisocyanate.

5. The coating composition of claim 2 in which the acrylic polymer consists essentially of polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group and styrene.

6. The coating composition of claim 5 in which the acrylic polymer consists essentially of butyl methacrylate, butyl acrylate, styrene, and hydroxy propyl acrylate.

7. The coating composition of claim 1 containing about 0.1–10% by weight, based on the weight of the binder, of ultraviolet light stabilizer or an antioxidant or mixtures thereof.

* * * * *